United States Patent
Alam et al.

(10) Patent No.: US 7,464,039 B2
(45) Date of Patent: *Dec. 9, 2008

(54) METHOD AND SYSTEM FOR MERGING ORDERS IN A FLEXIBLE ORDER TRANSACTION SYSTEM

(75) Inventors: Muhammad M. Alam, Santa Clara, CA (US); Ruediger Meyfarth, Heidelberg (DE); Sam S. Hwang, Los Altos, CA (US); Rama Koti R. Konatham, Sunnyvale, CA (US)

(73) Assignee: SAP AG, Walldorf (DE)

( * ) Notice: Subject to any disclaimer, the term of this patent is extended or adjusted under 35 U.S.C. 154(b) by 1112 days.

This patent is subject to a terminal disclaimer.

(21) Appl. No.: 10/851,282

(22) Filed: May 21, 2004

(65) Prior Publication Data

US 2005/0261948 A1 Nov. 24, 2005

(51) Int. Cl.
G06Q 10/00 (2006.01)
G06Q 30/00 (2006.01)
G06F 17/50 (2006.01)
G06F 17/00 (2006.01)

(52) U.S. Cl. ................ 705/1; 705/6; 705/7; 705/8; 705/9; 705/10; 705/26; 705/28; 705/29; 705/400; 705/500; 700/99; 700/100; 700/105

(58) Field of Classification Search ............. 705/1, 705/6, 7, 8, 9, 10, 26, 28, 29, 400, 500; 700/99, 700/100, 105
See application file for complete search history.

(56) References Cited

U.S. PATENT DOCUMENTS

| 5,818,716 | A | * | 10/1998 | Chin et al. | 700/100 |
| 6,023,683 | A | | 2/2000 | Johnson et al. | |
| 2001/0027447 | A1 | * | 10/2001 | Matsuura | 705/400 |
| 2002/0069103 | A1 | * | 6/2002 | Puri et al. | 705/11 |
| 2002/0077979 | A1 | | 6/2002 | Nagata | |
| 2002/0099585 | A1 | * | 7/2002 | Locke | 705/7 |
| 2003/0172007 | A1 | * | 9/2003 | Helmolt et al. | 705/28 |
| 2004/0143488 | A1 | * | 7/2004 | Wang | 705/10 |
| 2005/0131779 | A1 | | 6/2005 | Kitamura et al. | |

FOREIGN PATENT DOCUMENTS

JP 2001154722 A 6/2001

* cited by examiner

*Primary Examiner*—Yogesh C Garg
(74) *Attorney, Agent, or Firm*—Kenyon & Kenyon LLP (57) ABSTRACT

A method and system for merging an order with a surviving order where production of the order is currently in progress in a flexible order transaction system where yield, scrap, and work-in-process (WIP) are calculated for reporting points in the merging order process and yield, scrap, and work-in-process units are transferred from reporting points in the merging order to reporting points in the surviving order. The transfer from the merging order to the surviving order occurring at several mapped reporting points for the single merge order action. Unmapped scrap, WIP, and/or component and resource usage may be transferred to the surviving order at preceding or subsequent mapped reporting points in the merging order.

22 Claims, 4 Drawing Sheets

METHOD AND SYSTEM FOR MERGING ORDERS IN A FLEXIBLE ORDER TRANSACTION SYSTEM

FIELD OF THE INVENTION

The present invention relates to a method and system for merging orders in a flexible order transaction system. In one embodiment of the present invention, the flexible order system relates to a shop floor manufacturing system controlling already in progress production orders.

BACKGROUND OF THE INVENTION

In conventional flexible order transaction systems in manufacturing, merging orders that are already in progress is possible but is limited in the way production is mapped between the merging order and in how scrap and work-in-process quantities are merged. For example, if a production process for the surviving order (i.e., the order remaining after the merge) involves 5 steps S1-S5 and the production process for the merging order (i.e., the order that disappears after the merge) involves 10 steps M1-M10, the merging order may typically be merged with the surviving order at single pair of mapped steps (e.g., M1 to S3). This mapping may occur between reporting points for the steps. A reporting point is the conclusion of a discrete step in a production process where an accurate accounting of the progress of an order may be made. Reporting points may be used to define the steps in the production process and it is typically at one pair of reporting points that orders are merged. Scrap and work-in-process (WIP) quantities are also merged where they exist at the mapped reporting points. However, scrap and WIP is not merged in conventional systems where they occur at reporting points not mapped from the merging order to the surviving order—conventional systems are limited to merging scrap and WIP only at mapped reporting points, referred to as "hard merging" of the scrap and WIP. Conventional flexible order transaction systems do no provide the ability to merge in progress production orders at multiple reporting points across the production process. Even the merging that is allowed is limited to merging scrap and WIP at the mapped reporting points.

Conventional flexible order transaction systems incorporate order merge functionality for production orders but do not provide for the detailed merging of orders at multiple reporting points across the production process. For example, the Oracle® Shop Floor Management 11i system is one example of a conventional flexible order transaction system. The SAP® Discrete Industry add-on is another example and incorporates order merge functionality for process orders. Additionally, these conventional systems limit the merging of work-in-process (WIP) to mapped reporting points between the merging and surviving order.

Providing greater flexibility in merging already in progress production orders is important for a number a reasons. This flexibility can help manufacturers who often need to bring an order or lot up to an efficient production order size. When several orders have dropped below the target order size due to scrap (i.e., unsuccessfully processed product) or splits (i.e., order splitting) or when subsequent steps in a production process are more efficient with larger order sizes, merging orders in a flexible manner can greatly enhance efficiency. For example, orders that were previously split may need to be reassembled before shipment to another plant or production line where larger order sizes are more cost efficient. Merging orders may also solve unexpected capacity constraints in the production process. These enhancements may be achieved through a more detailed merging of orders allowing the merge to occur at several reporting points mapped between the processes of the orders. A more detailed method for the transfer of WIP from a merging order to a surviving order may also improve a flexible order transaction system.

SUMMARY

In one embodiment of the present invention, a method for merging an order with a surviving order in a flexible order transaction system where production of the order is currently in progress allows the production to be merged at multiple points in the production process overcoming some of the limitations of conventional systems. According to one embodiment, a request to merge the order only needs to specify the order to be merged and the surviving order. At each reporting point in the process for the merging order, the quantity of successfully processed product (i.e., the yield), the quantity of unsuccessfully processed product that cannot be reprocessed (i.e., the scrap), and the as of yet unprocessed product (i.e., the work-in-process or WIP) are determined. In another embodiment, the WIP may include not only the as of yet unprocessed product but also unsuccessfully processed product that can be reprocessed (i.e., reworked) and/or the product that is currently being processed. The reporting points in the merging order are mapped to reporting points in the surviving order and the yield, scrap, and WIP at each mapped reporting point in the merging order are transferred to the corresponding mapped reporting point in the surviving order. The scrap and WIP at each unmapped reporting point in the merging order may also be transferred to the surviving order. The unmapped scrap and WIP may be transferred using the mapping at the first preceding (i.e., first earlier) mapped reporting point in the merging order in one embodiment of the present invention. In another embodiment, the unmapped scrap and WIP may be transferred using the mapping at the first subsequent mapped reporting point in the merging order. The present invention allows the merging of an order with a surviving order to occur at multiple reporting points in a single merge order transaction. For example, using the SAP® Flexible Order Transaction in the Advanced Planning and Optimization (APO), a merge order transaction may include the merging of production quantities (yield, scrap, and WIP) across multiple reporting points between several merging orders. The mapping between the process associated with the merging order and the process associated with the surviving order may already exist in a mapping table of the flexible order transaction system or may be specified during the merge order request in separate embodiments of the present invention. Even where a user specifies mapping, the user does not have to specify all the mapping between reporting points in the merging and surviving orders as may be required in conventional systems. Additionally, detail mapping does not need to be provided when orders are merged. For example, where to merge unmapped scrap and WIP can be automatically determined by the system by using a "soft up" approach where the unmapped scrap and WIP may be merged at the first preceding mapped reporting point in one embodiment of the present invention. In another embodiment, under these same circumstances, unmapped scrap and WIP may be merged at the next subsequent mapped reporting point using a "soft down" approach.

DETAILED DESCRIPTION

In a flexible order transaction system, orders may be merged allowing the transfer of production between several points in the production process of a merging order (i.e., the order that will be eliminated after the merge) to corresponding points in the production process of the surviving order (i.e., the order that will remain after the merge) according to one embodiment of the present invention. The merging of 2 or more orders (i.e., the surviving order and 1 or more merging orders) results in only 1 remaining order (i.e., the surviving order). In an alternative embodiment, all orders are merging orders and a single surviving order is created with the same process structure (i.e., processing) as one of the merging orders. In one embodiment of the present invention, the merging orders may have a different structure and processing (i.e., process structure) from the surviving order. The processing or process structure is the actual work (i.e., processing) performed on the production inputs (i.e., the components) using the process resources (i.e., resources) to transform a product from components at the start of the process to a final product according to one embodiment of the present invention. The actual work (i.e., the processing or process structure) that is performed may differ between the merging order and the surviving order or may share the same process structure. If the process structure of the merging order is different from the surviving order, mapping between the processes as discussed below may be necessary. In another embodiment of the present invention, a merging order may be placed for a different final product than the surviving order.

Figure 1:
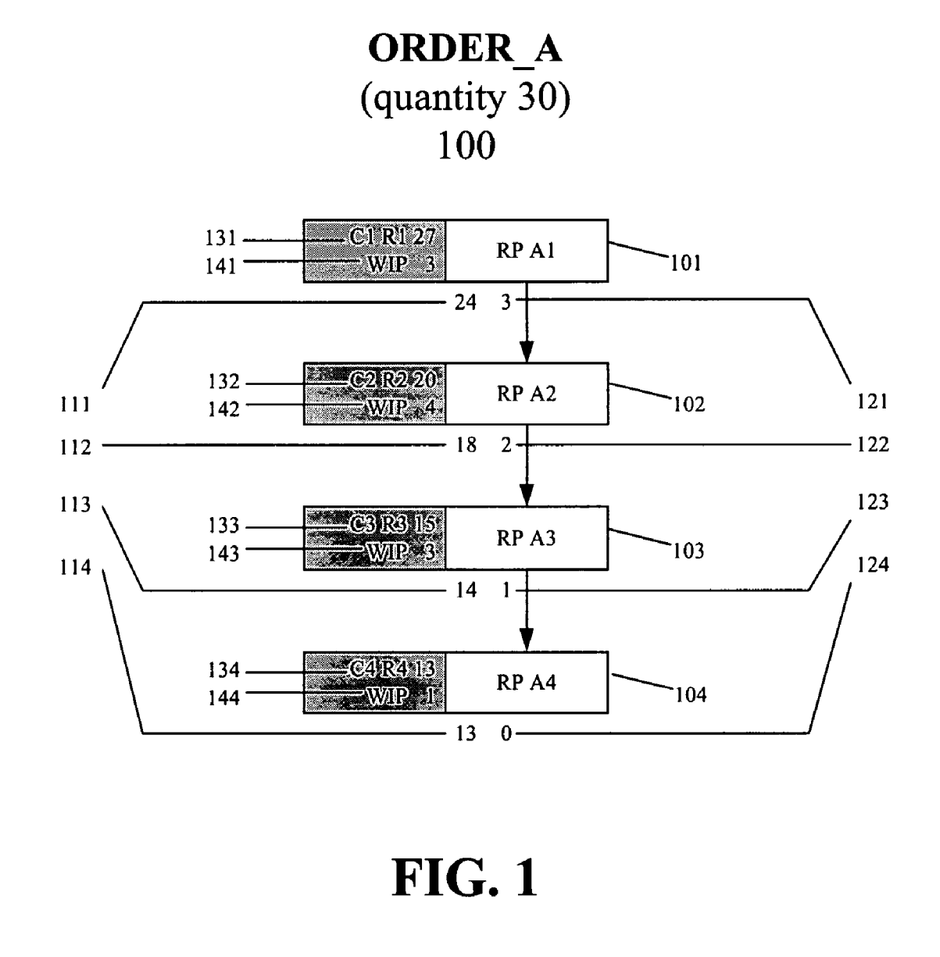
FIG. 1 is a diagram illustrating the processing of an example production order before the order is merged according to one embodiment of the present invention.

FIG. 1 is a diagram illustrating the processing of an example production order before the order is merged according to one embodiment of the present invention. The example embodiment shown in FIG. 1 depicts an order, Order_A, 100 for the production of 30 units of a product. A production process, according to one embodiment of the present invention, is the process needed to convert inputs (e.g., components and resources) into a product or to modify a manufactured item in order to produce a desired finished product. The inputs into the production process can be considered components, the physical items required to produce the product, and resources, the labor, machinery, and other services required to produce the product. In the example embodiment shown in FIG. 1, a production process may be divided in several discrete steps representing particularly distinct or distinguishable portions of the process at the conclusion of which an accurate accounting of the progress of an order may be made. A reporting point (RP) is the conclusion of one of these portions or steps in the production process and at which the status of the order may be confirmed. The order status may be determined by any conventional means including manual and automated reporting on order status. In the embodiment shown in FIG. 1, the production process associated with Order_A 100 includes four reporting points (RP): RP A1 101, RP A2 102, RP A3 103, and RP A4 104.

At each reporting point (RP), the inputs for the product are consumed as part of the shop floor production process according to one embodiment of the present invention. At each reporting point, a unit of the product is either successfully processed—ending up as "yield"—or is unsuccessfully processed—ending up as "scrap". Yield is the quantity of the product that has already been processed at an activity level reported on at the reporting point. Scrap is the quantity that at a given activity level (reporting point) will no longer be further processed. The remaining quantity still undergoing processing or still waiting for processing to initiate for the reporting point (RP) is considered the Work-in-Process (WIP) quantity. According to one embodiment of the present invention, if an unsuccessfully processed unit of the product can be reprocessed, it is considered WIP instead of scrap, which can't be reprocessed. In other words, according to this embodiment, an unsuccessfully processed unit of product at a reporting point is considered scrap if it can't be reprocessed while if it can be reprocessed, it is considered WIP and eventually reprocessed—scrap is not salvageable.

At each reporting point, the quantity of yield, scrap, and WIP equal the yield from the preceding reporting point according to one embodiment of the present invention. At the first reporting point, the quantities of yield, scrap, and WIP equal the order quantity according to this embodiment. For example in FIG. 1, Order_A 100 is placed for a quantity of 30 units of the product. At reporting point A1 101, the first reporting point, the quantity of yield, scrap, and WIP equal the 30 units for the order. The quantity of yield at RP A1 101 is 24 units 111 while the quantity of scrap is 3 units 121 and the quantity of WIP is 3 units 141 totaling the 30 units for the order 100. At reporting point A2 102, the second reporting point, the quantity of yield, scrap, and WIP need to equal the 24 units of yield 111 at the preceding RP A1 according to this embodiment of the present invention. The quantity of yield at RP A2 102 is 18 units 112 while the quantity of scrap is 2 units 122 and the quantity of WIP is 4 units 142 totaling the 24 units of yield 111 at RP A1 101. The yield quantity at the final reporting point in a production process represents the total quantity of the finished product produced so far and may be the reporting point at which the ordered goods are received. For example, the final reporting point shown in FIG. 1 is reporting point A4 104. At RP A4 104, the quantity of yield is 13 units 114 representing the total quantity of the finished product produced up to this point.

In the example shown in the embodiment in FIG. 1, an order 100, Order_A, is placed for a quantity of 30 of a product. The process for Order_A includes four reporting points in the example shown in FIG. 1. At reporting point A 1101, 24 units 111 of the product have been successfully processed and are considered yield at this reporting point. Three units 121 have been unsuccessfully processed and can't be reworked (i.e., reprocessed) and have become scrap at this reporting point. A remaining 3 units 141 of the product have yet to begin or complete the production process up to reporting point A1 and are consider WIP. Components and resources are used in the processing occurring up to RP A1 101. In the example embodiment in FIG. 1, 1 unit of component and 1 unit of resource are used per unit processed. At reporting point A1 101, the quantity of components (C1) and resources (R1) used each equal 27 units 131 for the units of yield 111 and scrap 121 that have been processed.

Of the 24 units of yield 111 at RP A1 101, 18 units 112 of the product have been successfully processed and are considered yield at reporting point A2 102. Two units 122 have been unsuccessfully processed and can't be reworked (i.e., reprocessed) and are scrap at RP A2 102. Four units 142 of the product (out of the 24 111) remain to be processed or to complete processing and are WIP at RP A2 102. The quantity of components (C2) and resources (R2) used for the processing to reporting point A2 102 each equal 20 units 132 for the units of yield 112 and scrap 122 that have been processed.

At reporting point (RP) A3 103, only 14 units 113 of the 18 units 112 of the product yielded at RP A2 102 have been successfully processed and have become yield. One unit 123 has been unsuccessfully processed and can't be reworked (i.e., reprocessed) and, therefore, is now scrap at RP A3 103. Three units 143 remain to be processed or to complete processing at RP A3 103 and are considered WIP. The quantity of components (C3) and resources (R3) used for the processing to reporting point A3 103 each equal 15 units 133 for the units of yield 113 and scrap 123 that have been processed.

Of the 14 units 113 of the product yielded (i.e., successfully processed) at RP A3 103, 13 units 114 have been successfully processed (are yield) at RP A4 104. Because RP A4 104 is the final reporting point, the 13 units 114 of yield at RP A4 104 are finished products of the process A1-A4 for Order_A 100 according to this embodiment of the present invention. There is no scrap 124 at RP A4 104 and the remaining one unit 144 is WIP at this reporting point. The quantity of components (C4) and resources (R4) used for the processing to reporting point A4 104 each equal 13 units 134 for the units of yield 114 and scrap 124 that have been processed.

According to the example depicted in FIG. 1, a quantity of 30 units 100 is ordered with 13 units 114 of final product produced at RP A4 104. The successfully processed yield throughout the process includes 24 units 111 at RP A1 101, 18 units 112 at RP A2 102, 14 units 113 at RP A3 103, and 13 units 114 at RP A4 104. Of the quantity of 30 units 100, 6 units have been unsuccessfully processed and are not capable of being reworked (i.e., reprocessed) and are considered scrap: 3 units 121 at RP A1 101, 2 units 122 at RP A2 102, 1 unit 123 at RP A3 103, and none 124 at RP A4 104. Of the quantity of 30 ordered, 11 units remain as WIP at the various reporting points: 3 units at RP A1, 4 units at RP A2, 3 units at RP A3, and 1 unit at RP A4. The example represented in FIG. 1 indicates that only the WIP remains to be processed. Yield and scrap require no further processing at the different reporting points. Therefore, only 11 units of the product (i.e., the WIP) remain to be processed: 3 units 141 at RP A1 101, 4 units 142 at RP A2 102, 3 units 143 at RP A3 103, and 1 unit 144 at RP A4 104. The final yield (i.e., the finished product) of 13, the total scrap of 6, and the total work-in-process (WIP) of 11 equal the total order quantity of 30 according to this embodiment.

Figure 2:
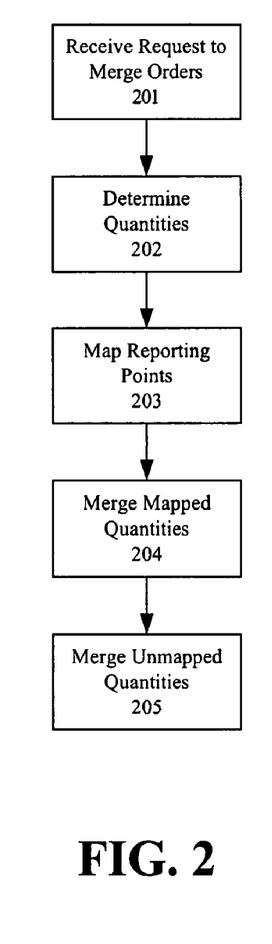
FIG. 2 is a diagram depicting the merge order process according to one embodiment of the present invention.

FIG. 2 is a diagram depicting the merge order process according to one embodiment of the present invention. The first step in the process for merging orders is to "Receive Request to Merge Orders" 201. The request may be received in any number of ways according to various embodiments of the present invention. In the example embodiment, the request is received from the customer placing the order through a flexible order transaction system, a software application allowing flexible orders to be placed including the merging of production orders already in progress. The request to merge the orders does not need to specify the quantity to be merged and may only need to specify the merging order and the surviving order. The quantity to be merged can be determined from the merging order even though it may be specified in the merge order request. In an alternative embodiment of the present invention, the merge order process described herein can be used to transfer partial quantity from a merging order with a surviving order, the merging order continuing to exist after the partial quantity is transferred. According to this embodiment, the user (e.g., the customer) may specify the partial quantity to be transferred as well as the merging (source) order and surviving (receiving) order.

In the "Determine Quantities" step 202, the quantities for each reporting point of the merging order are determined. According to this step, the yield, scrap, and work-in-process (WIP) are calculated at each reporting point in the process for the merging order. For example, using the information provided in FIG. 1 where Order_A is a merging order, reporting points A1-A4 101-104 exist for the process used to implement Order_A. At reporting point A1 1101, the following quantities of the product are determined: 24 units of yield 111, 3 units of scrap 121, and 3 units of WIP 141 all equaling the 30 units 100 requested in the original order. At reporting point A2 102, the following quantities of the product are determined: 18 units of yield 112, 2 units of scrap 122, and 4 units of WIP 123 all equaling the 24 units of yield 111 ready for further processing after RP A1 101. At reporting point A3 103, the following quantities of the product are determined: 14 units of yield 113, 1 unit of scrap 123, and 3 units of WIP 143 all equaling the 18 units of yield 112 ready for further processing after RP A2 102. At reporting point A4 104, the following quantities of the product are determined: 13 units of yield 114, no units of scrap 124, and 1 unit of WIP 144 all equaling the 14 units of yield 113 ready for further processing after RP A3 103.

In the "Map Reporting Points" step 203, mapping data between the reporting points of the processes corresponding to the merging order(s) (e.g., Order_B) and the surviving order (e.g., Order_A) is determined. The mapping data may be determined in different ways according to various embodiments of the present invention. In one embodiment, the mapping data may be determined by retrieving mapping data already stored for the processes. For example, data from a mapping table containing the reporting point mapping between the processes associated with the merging order, e.g., Order_B, and the surviving order, e.g., Order_A, may be retrieved. In another embodiment, a user may specify the mapping data when the merging of the orders is requested. For example, when the user enters the merge order request using flexible order transaction software running on a computing device such as a computer, the user may specify that reporting points B1, B3, and B6 in the merging order correspond to reporting points A1, A2, and A4 respectively in the surviving order. In another embodiment of the present invention, the mapping data may be calculated using other variables to determine at which reporting points similar processing has occurred.

The mapping data does not need to include mapping from all the reporting points in the process associated with the merging order to corresponding reporting points in the process associated with the surviving order, according to this embodiment—though all reporting points may be mapped. For example, the mapping between a merging order, e.g., Order_B, with associated reporting points B1-B6 may only map 3 of the reporting points (e.g., B1, B3, and B6) with a surviving order, e.g., Order_A. Just as all the reporting points in the process associated with the merging order do not need to be mapped, all the reporting points in the process associated with the surviving order also do not need to be mapped to the merging order. For example, a surviving order, e.g., Order_A, with associated reporting points A1-A4 may only have 3 reporting points mapped to the merging order, e.g., Order_C. In one embodiment of the present invention, two or more reporting points associated with a merging order (e.g., Order_D) may be mapped to a single reporting point associated with a surviving order (e.g., Order_A). This may occur where the additional processing for the second reporting point in the merging order (e.g., Order_D) does not add anything above the processing for the first reporting point in the merging order in relation to the processing that needs to occur in the surviving order (e.g., Order_A). For example, under these circumstances, reporting points D2 and D3 associated with a merging order, Order_D, may be mapped to a single reporting point A3 associated with a surviving order, Order_A. In one embodiment of the present invention, a single reporting point associated with a merging order (e.g., Order_E) may be mapped to two or more reporting points associated with a surviving order (e.g., Order_A). For example, reporting point E3 associated with a merging order, Order_E, may be mapped to reporting points A3 and A4 associated with a surviving order, Order_A. The above examples help illustrate the implementation of mapping in various embodiments of the present invention. Any conventional mapping means may be used to determine and supply the mapping data required.

In the "Merge Mapped Quantities" step 204, yield (i.e., the successfully processed units), scrap (i.e., the unsuccessfully processed units that can't be reworked), and the WIP (i.e., units awaiting or undergoing processing) are transferred from the merging order (e.g., Order_B) to the surviving order (e.g., Order_A) at each mapped reporting point. For example, if reporting points B1, B3, and B6 associated with Order_B (the merging order) are mapped respectively to reporting points A1, A2, and A4 associated with Order_A (the surviving order), yield, scrap, and WIP are transferred from Order_B to Order_A at each of these mapped reporting points. Yield, scrap, and WIP are therefore transferred between the mapped reporting point pairs: RP B1-RP A1, RP B3-RP A2, and RP B6-RP A4. The component and resource usage for the yield and scrap transferred at the mapped reporting points is also transferred to the surviving order.

In the "Merge Unmapped Quantities" step 205, WIP, scrap, and the component and resource usage from non-mapped reporting points in the merging order (e.g., Order_B) are also transferred to the surviving order (e.g., Order_A) at the next mapped reporting point according to one embodiment of the present invention. This embodiment is a "soft down" transfer of unmapped quantities of WIP and scrap. If there are no further mapped reporting points between the merging and surviving orders, the non-mapped quantities are transferred to the last reporting point in the surviving order according to one embodiment of the present invention. In an alternative embodiment of the present invention, WIP, scrap, and the component and resource usage from non-mapped reporting points in the merging order are transferred to the surviving order at the next preceding mapped reporting point in the production process. This alternative embodiment is a "soft up" transfer of unmapped quantities of WIP and scrap. If there are no preceding mapped reporting points between the merging and surviving orders, the non-mapped quantities are transferred to the first reporting in the surviving order according to one embodiment of the present invention.

The steps described above are illustrative of the process and they can be performed in a different sequence, as necessary. In particular, according to one embodiment of the present invention, the steps of "Merge Mapped Quantities" 204 and "Merge Unmapped Quantities" 205 can be performed simultaneously or in sequence for each of the reporting points between a merging order and the surviving order. In another embodiment, all the existing orders may be considered merging orders with a new surviving order created matching the process structure of one of the merging orders and receiving the yield, scrap, and WIP from the merging orders.

Figure 3:
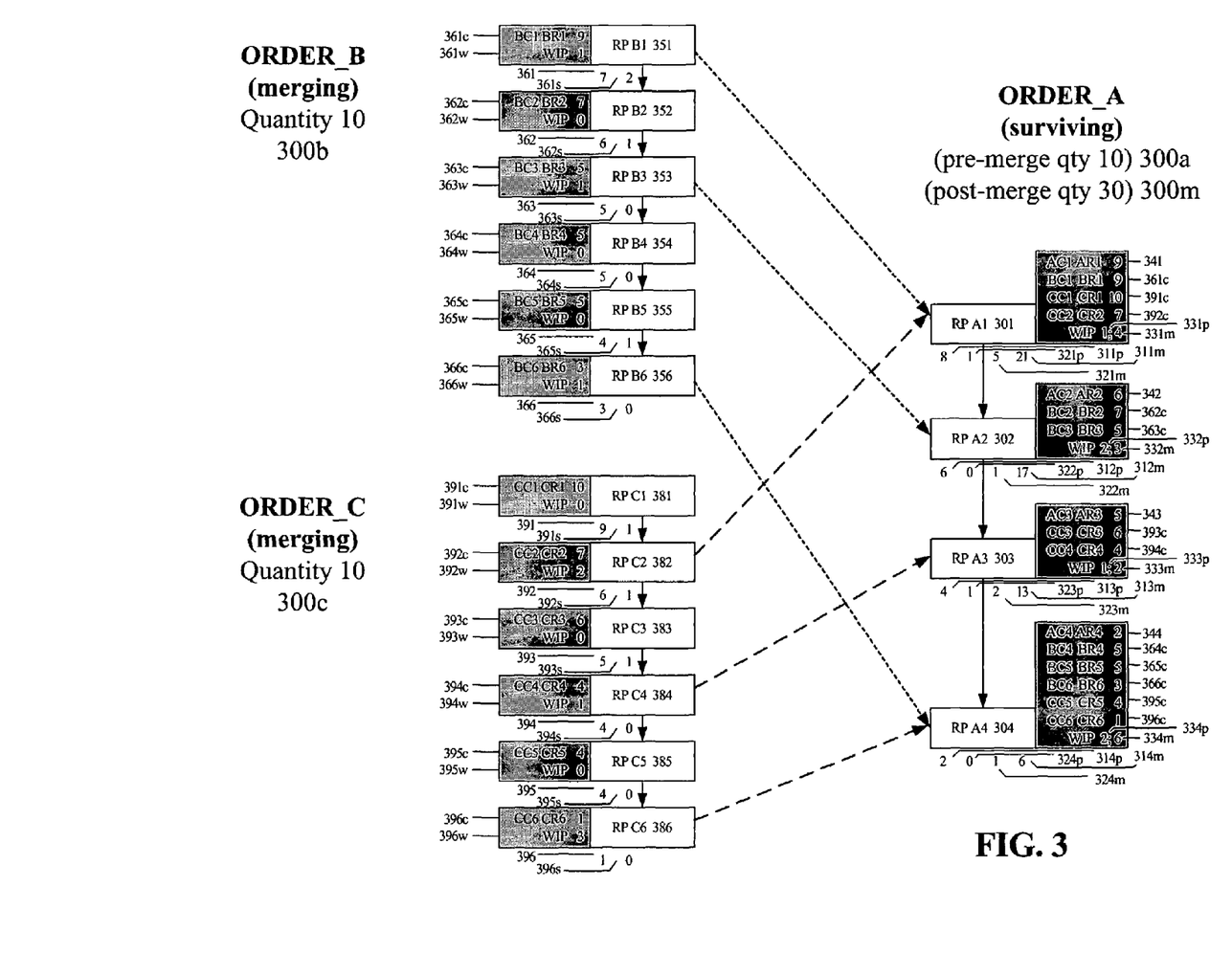
FIG. 3 is a diagram illustrating the merging of three orders according to one embodiment of the present invention using a "soft down" approach to transferring unmapped quantities.

FIG. 3 is a diagram illustrating the merging of three orders according to one embodiment of the present invention. According to the example embodiment shown in FIG. 3, two merging orders, Order_B 300*b* and Order_C 300*c*, are merged with the surviving order, Order_A, 300*a*, 300*m*. The surviving Order_A 300*a*, 300*m* was originally placed for a quantity of 10 units 300*a* before the merging of the orders. The merging of the orders combines their placed quantities creating a post-merge quantity of 30 units 300*m* in the surviving order 300*m*. The original order quantities and the resulting post-merge surviving order quantity are reflected as follows:

|  | Original (Pre-Merge) Order Quantity | Resulting (Post-Merge) Order Quantity |
| --- | --- | --- |
| Order_A | 10 | 30 |
| Order_B | 10 | — |
| Order_C | 10 | — |

According to the example shown in FIG. 3, yield, scrap, and WIP are transferred from the merging orders, Order_B 300*b* and Order_C 300*c*, to the surviving order, Order_A 300*m*. In an alternative embodiment, a new surviving order is created and all the original orders are merged into the new order and then deleted. The implementation of the merge according to the embodiment depicted in FIG. 3 depends on the mapping between reporting points of the orders and is outlined below.

In the example embodiment shown in FIG. 3, yield, scrap, and WIP are transferred from the merging orders, Order_B 300*b* and Order_C 300*c*, to the surviving Order_A 300*a*, 300*m*. The yield, scrap, and WIP are transferred according to the mapping between the reporting points associated with the merging orders, Order_B 300*b* and Order_C 300*c*, and the reporting points associated with the surviving Order_A 300*a*, 300*m*. At reporting point B1 351, 7 units of successfully processed yield 361, 2 units of unsuccessfully process scrap 361*s* (which can't be reprocessed), and 1 unit of work-in-process (WIP) 361*w* are available. The yield 361, scrap 361*s*, and WIP 361*w* at RP B1 351 equal the total order quantity 300*b* of 10 units for Order_B. Reporting point B1 351 maps to reporting point A1 301 in the surviving order. At reporting point A1 301, 8 units of yield 311*p*, 1 unit of scrap 321*p*, and 1 unit of WIP 331*p* exist before the merge (i.e., pre-merge). This yield 311*p*, scrap 321*p*, and WIP 331*p* at RP A1 301 equal the total order quantity 300*a* of 10 units for Order_A before the merge. According to the embodiment shown in FIG. 3, all quantities are transferred from the merging order to the surviving order at the mapped reporting points. For example, a yield of 7 units 361, a scrap of 2 units 361*s*, and a WIP of 1 unit 361*w* at RP B1 351 are transferred to RP A1 301 and added to the yield 311*m*, scrap 321*m*, and WIP 331*m*. In addition, the component (BC1 and resource (BR1) usage 361*c* at RP B1 351 is also transferred to RP A1 301. Reporting point B2 352 has a yield of 6 units 362, a scrap of 1 unit 362*s*, and a WIP of 0 units 362*w* but is not mapped to Order_A 300*a*, 300*m*. The yield 362, scrap 362*s*, and WIP 362*w* at RP B2 352 equal the yield of 7 units 361 from the previous reporting point RP B1 351. Reporting point B3 353 has a yield of 5 units 363, a scrap of 0 units 363*s*, and a WIP of 1 unit 363w equaling the yield of 6 units 362 at the previous reporting point RP B2 352. RP B3 353 is mapped to RP A2 302 of Order_A 300a, 300m and, therefore, the yield 363, scrap 363s, and WIP 363w are transferred and added to the existing pre-merge yield of 6 units 312p, scrap of 0 units 322p, and WIP of 2 units 332p at RP A2 302. According to the embodiment depicted in FIG. 3, the scrap 362s and WIP 362w of any unmapped preceding reporting points (in this case RP B2 352) are also transferred. Therefore, an additional scrap of 1 unit 362s and a WIP of 0 units 362w is also transferred from RP B2 352 at the next mapped reporting RP B3 353 to RP A2 302. Unmapped yield is not transferred according to this embodiment, only unmapped scrap and WIP. The component (B3) and resource (BR3) usage 363c at the mapped reporting point 353 and component (BC2) and resource (BR2) usage 362c at any preceding unmapped reporting point 352 are also transferred to RP A2 302. Reporting point B4 354 has a yield of 5 units 364, a scrap of 0 units 364s, and a WIP of 0 units 364w totaling the 5 units of yield 363 at the previous RP B3 353. RP B4 354 is not mapped to Order_A 300a, 300m. Reporting point B5 355 has a yield of 4 units 365, a scrap of 1 unit 365s, and a WIP of 0 units 365w totaling the 5 units of yield 364 at the previous RP B4 354. RP B5 355 is not mapped to Order_A 300a, 300m. Reporting point B6 356 has a yield of 3 units 366, a scrap of 0 units 366s, and a WIP of 1 unit 366w totaling the 4 units of yield 365 at the previous RP B5 355. RP B6 356 is mapped to RP A4 304 in Order_A 300a, 300m and, therefore, its yield 366, scrap 366s, and WIP 366w are transferred and added to the yield of 2 units 314p, scrap of 0 units 324p, and WIP of 2 units 334p that exist at RP A4 304 prior to the merge. As previously stated, preceding unmapped scrap and WIP are also transferred according to this embodiment of the present invention. At preceding RP B4 354, there is no scrap 364s (0 units) and no WIP 364w (0 units) to transfer. At preceding RP B5 355, there is 1 unit of scrap 365s and no WIP 365w (0 units) to transfer to RP A4 304. In addition, the component (BC6) and resource (BR6) usage 366c from the mapped reporting point 356 and the component (BC4, BC5) and resource (BR4, BR5) usage 364c, 365c for the preceding unmapped reporting points are also transferred to RP A4 304.

The other merging order is Order_C 300c. At the first reporting point C1 381, a yield of 9 units 391, a scrap of 1 unit 391s, and a WIP of 0 units 391w total the placed order quantity of 10 units 300c. RP C1 381 is not mapped to the surviving Order_A 300a, 300m. Reporting point C2 382 has a yield of 6 units 392, a scrap of 1 unit 392s, and a WIP of 2 units 392w totaling the yield 391 of 9 units at the preceding RP C1 381. RP C2 382 is mapped to RP A1 301 and, therefore, the yield 392, scrap 392s, and WIP 392w are transferred and added to RP A1 301. As previously stated, any preceding unmapped scrap and WIP are also transferred according to this embodiment. The scrap of 1 unit 391s and no WIP 391w (0 units) are also transferred from RP C1 381 to RP A1 301. In addition, the component (CC2) and resource (CR2) usage 392c from the mapped reporting point 382 and the component (CC1) and resource (CR1) usage 391c from any unmapped preceding reporting points 381 are also transferred to RP A1 301. Reporting point C3 383 has a yield of 5 units 393, a scrap of 1 unit 393s, and a WIP of 0 units 393w totaling the yield of 6 units 392 at the preceding RP C2 382. RP C3 383 is not mapped to the surviving Order_A 300a, 300m. Reporting point C4 384 has a yield of 4 units 394, a scrap of 0 units 394s, and a WIP of 1 unit 394w totaling the 5 units of yield 393 at the preceding RP C3 383. RP C4 384 is mapped to RP A3 303 and, therefore, the yield 394, scrap 394s, and WIP 394w are transferred. In addition, the scrap (1 unit 393s) and WIP (0 units 393w) from any preceding unmapped reporting points 383 are also transferred—in this case from RP C3 383. Additionally, the component (CC4, CC3) and resource (CR4, CR3) usage 394c, 393c from the mapped reporting point 384 and any preceding unmapped reporting points 383 are also transferred to RP A3 303. Reporting point C5 385 has yield of 4 units 395, a scrap of 0 units 395s, and a WIP of 0 units 395w totaling the yield of 4 units 394 at the preceding RP C4 394. RP C5 385 is not mapped to the surviving Order_A 300a, 300m. Reporting point C6 386 has a yield of 1 unit 396, no scrap 396s, and a WIP of 3 units 396w totaling the yield of 4 units 395 at the preceding RP C5 385. RP C6 386 is mapped to RP A4 304 and, therefore, the yield 396, scrap 396s, and WIP 396w are transferred. According to this embodiment, the scrap (0 units 395s) and the WIP (0 units 395w) from any preceding unmapped reporting points 385 are also transferred—in this case from RP C5 385. Component (CC6, CC5) and resource (CR6, CR5) usage 396c, 395c from the mapped reporting point 386 and any preceding unmapped reporting points 385 are also transferred to RP A4 304.

The end result of the merging process is that all the yield, scrap, WIP, and component and resource usage is transferred from the merging orders to the surviving order according to one embodiment of the present invention. In the example embodiment depicted in FIG. 3, at RP A1 301, the original pre-merge yield of 8 units 31p is increased by 7 units 361 from RP B1 351 and 6 units 392 from RP C2 382 resulting in a post-merge yield of 21 units 311m. The pre-merge scrap of 1 unit 321p is increased by the 2 units 361s from RP B1 351, 1 unit 392s from RP C2 382, and 1 unit 391s from RP C1 381 resulting in a post-merge scrap of 5 units 321m. The pre-merge WIP of 1 unit 331p is increased by 1 unit 361w from RP B1 351, 2 units 392w from RP C2 382, and 0 units 391w from RP C1 381 resulting in a post-merge WIP of 4 units 331m. Component and resource usage 361c, 392c, 391c is transferred from RP B1 351, RP C2 382, and RP C1 381 and added to the component (AC1) and resource (AR1) usage 341 at RP A1 301.

At reporting point A2 302, the pre-merge yield of 6 units 312p is increased by 5 units 363 from RP B3 353. Because there is no mapping between RP A2 302 and merging Order_C 300c, the previously transferred yield of 6 units 392 continues at RP A2 302 for the merged Order_C 300c according to one embodiment of the present invention. The end result is a post-merge yield of 17 units 312m. The pre-merge scrap of 0 units 322p is increased by 0 units 363s from RP B3 353 and 1 unit 362s from RP B2 352 resulting in a post-merge scrap of 1 unit 322m. Order_C 300c does not map to RP A2 302 and does not, therefore, alter the scrap or WIP at RP A2 302. The pre-merge WIP of 2 units 332p is increased by 1 unit 363w from RP B3 353 and 0 units 362w from RP B2 352 resulting in a post-merge WIP of 3 units 332m. Component and resource usage 363c, 362c is transferred from RP B3 353 and RP B2 352 and added to the component (AC2) and resource (AR2) usage 342 at RP A2 302.

At reporting point A3 303, the pre-merge yield of 4 units 313p is increased by 4 units 394 from RP C4 384. Because there is no mapping between RP A3 303 and merging Order_B 300b, the previously transferred yield of 5 units 363 from RP B3 353 continues at RP A3 303 for the merged Order_B 300b according to one embodiment of the present invention. The end result is a post-merge yield of 13 units 313m. The pre-merge scrap of 1 unit 323p is increased by 0 units 394s from RP C4 384 and 1 unit 393s from RP C3 383 resulting in a post-merge scrap of 2 units 323m. Order_B 300b does not map to RP A3 303 and does not, therefore, alter the scrap or WIP at RP A3 303. The pre-merge WIP of 1 unit 333p is increased by 1 unit 394w from RP C4 384 and 0 units 393w from RP C3 383 resulting in a post-merge WIP of 2 units 333m. Component and resource usage 394c, 393c is transferred from RP C4 384 and RP C3 383 and added to the component (AC3) and resource (AR3) usage 343 at RP A3 303.

At reporting point A4 304, the pre-merge yield of 2 units 314p is increased by 3 units 366 from RP B6 356 and 1 unit 396 from RP C6 386 resulting in a post-merge yield of 6 units 314m. The pre-merge scrap of 0 units 324p is increased by 0 units 366s from RP B6 356, 1 unit 365s from RP B5 355, 0 units 364s from RP B4 354, 0 units 396s from RP C6 386, and 0 units 395s from RP C5 385 resulting in a post-merge scrap of 1 unit 324m. The pre-merge WIP of 2 units 334p is increased by 1 unit 366w from RP B6 356, 0 units 365w from RP B5 365, 0 units 364w from RP B4 364, 3 units 396w from RP C6 386, and 0 units 395w from RP C5 385 resulting in a post-merge WIP of 6 units 334m. Component and resource usage 366c, 365c, 364c, 396c, 395c is transferred from RP B6 356, RP B5 355, RP B4 354, RP C6 386, and RP C5 385 and added to the component (AC4) and resource (AR4) usage 344 at RP A4 304.

In other embodiments of the present invention, it may be possible to decrease or increase the total order quantity for the surviving order during the merging process. For example, if the merging orders and the pre-merge surviving order have a total placed order quantity of 30, the resulting surviving order may be placed for a quantity greater than 30. The additional quantity may result in additional WIP at the initial reporting point in the surviving order. In another embodiment, the order quantity may be reduced during the merging process. For example, if the merging orders and the pre-merge surviving order have a total placed order quantity of 30, the resulting surviving order may be placed for a quantity less than 30. The decreased quantity may result from eliminating WIP or reducing order quantity to reflect scrap at the initial reporting point in the surviving order.

In the example embodiment depicted in FIG. 3, scrap, WIP, and component and resource usage from unmapped reporting points in the merging orders were transferred to the surviving order at the next or subsequent mapped reporting point. This process may be referred to as "soft down" merging. According to one embodiment of the present invention, if there is no subsequent mapped reporting point, scrap, WIP, and/or component and resource usage may be merged with the surviving order at the final reporting point in the surviving order. In another embodiment of the present invention, WIP, scrap, and/or component and resource usage at an unmapped reporting point may be merged with the surviving order at the first earlier or preceding mapped reporting point. If there is no preceding mapped reporting point, WIP, scrap, and/or component and resource usage may be merged with the surviving order at the first reporting point in the surviving order. This process may be referred to as "soft up" merging. In one embodiment, the merging of WIP, scrap, and/or component and resource usage at the final reporting point in a merging order is always made to the final reporting point in the surviving order regardless of whether "soft up" or "soft down" merging is being used.

Figure 4:
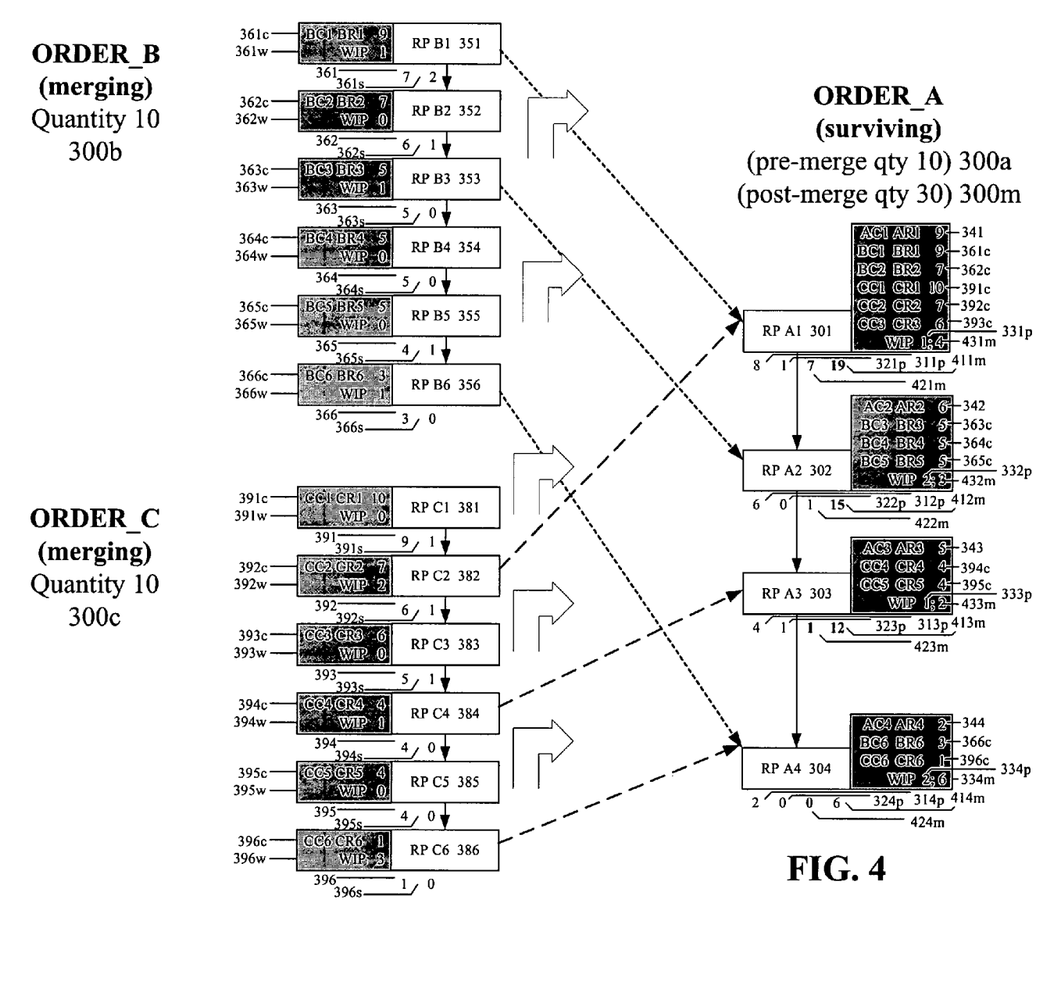
FIG. 4 is a diagram illustrating the "soft up" process of merging WIP, scrap, and component and resource usage from unmapped reporting points at the first preceding mapped reporting point according to one embodiment of the present invention.

FIG. 4 is a diagram illustrating the process of merging WIP, scrap, and component and resource usage from unmapped reporting points at the first preceding mapped reporting point according to one embodiment of the present invention. The example embodiment shown in FIG. 4 is similar to the example shown in FIG. 3 except that the unmapped reporting point values in Order_B 300b and Order_C 300c are merged with the preceding mapped reporting points (or the first reporting point) thereby changing the post-merge yield, scrap, and WIP values in the surviving Order_A 300m as well as the distribution of component and resource usage. One notable change in the example embodiment depicted in FIG. 4 is the decrease in the post-merge yield by 2 units 411m at RP A1 301 and the increase in 2 units of post-merge scrap 421m reflecting a decrease in the mapped yield by the subsequent unmapped scrap that is transferred at this preceding reporting point. These changes are further reflected in modifications to the yield 412m, 413m and the scrap 423m, 424m at the subsequent reporting points A2-A4 302-304 in the surviving order.

What is claimed is:

1. A method for merging an order with a surviving order in a flexible order transaction system wherein production of the order is currently in progress, comprising the steps executed by a computer processor of:
   receiving a request to merge the order, the request specifying the surviving order;
   determining at least one of a yield quantity, a scrap quantity, and a work-in-process quantity at each reporting point in a first production process for the order, the first production process including a plurality of reporting points;
   mapping at least two pairs of reporting points between the first production process for the order and a second production process for the surviving order, the second production process including a plurality of reporting points;
   merging, at each mapped pair of reporting points, the yield quantity, the scrap quantity, and the work-in-process quantity from the order to the surviving order; and
   transferring, for each unmapped reporting point in the first production process for the order, the scrap quantity and the work-in-process quantity as a function of the mapped reporting points.

2. The method according to claim 1, wherein the order is for the manufacturing of a product.

3. The method according to claim 1, wherein the yield quantity is a quantity of a product that is successfully processed.

4. The method according to claim 1, wherein the scrap quantity is a quantity of a product that is unsuccessfully processed and can't be reprocessed.

5. The method according to claim 1, wherein the work-in-process quantity is a quantity of a product that has not yet undergone processing.

6. The method according to claim 1, wherein the work-in-process quantity is at least one of a first quantity of a product that has not yet undergone processing, a second quantity of the product currently undergoing processing, and a third quantity of the product that is unsuccessfully processed but can still be reprocessed.

7. The method according to claim 1, wherein the mapping step further comprises:
   mapping at least two pairs of reporting points between the first production process for the order and a second production process for the surviving order as a function of a mapping table, the mapping table stored as part of the flexible order system and the second production process including a plurality of reporting points.

8. The method according to claim 1, wherein the plurality of reporting points for the first production process is different than the plurality of reporting points for the second production process.

9. The method according to claim 1, wherein the first production process is different than the second production process, the second process structure including a plurality of reporting points that is different than the plurality of reporting points for the first production process.

10. The method according to claim 1, the transferring step further comprising:
transferring, for each unmapped reporting point in the first production process for the order, the scrap quantity and the work-in-process quantity to a reporting point in the second production process for the surviving order as a function of the mapped reporting points using at least one of a first preceding mapped reporting point in first production process and the first reporting point in the second production process.

11. The method according to claim 1, further comprising the step of:
transferring, for each unmapped reporting point in the first production process for the order, the scrap quantity and the work-in-process quantity to a reporting point in the second production process for the surviving order as a function of the mapped reporting points using at least one of a first subsequent mapped reporting point in first production process and the last reporting point in the second production process.

12. A system for merging an order with a surviving order in a flexible order transaction system wherein production of the order is currently in progress, comprising:
a program memory;
a storage device; and
a processor, wherein the processor is adapted to:
(i) receive a request to merge the order, the request specifying the surviving order,
(ii) determine at least one of a yield quantity, a scrap quantity, and a work-in-process quantity at each reporting point in a first production process for the order, the first production process including a plurality of reporting points,
(iii) map at least two pairs of reporting points between the first production process for the order and a second production process for the surviving order, the second production process including a plurality of reporting points,
(iv) merge, at each mapped pair of reporting points, the yield quantity, the scrap quantity, and the work-in-process quantity from the order to the surviving order, and
(v) transfer, for each unmapped reporting point in the first production process for the order, the scrap quantity and the work-in-process quantity as a function of the mapped reporting points.

13. The system according to claim 12, wherein the yield quantity is a quantity of a product that is successfully processed.

14. The system according to claim 12, wherein the scrap quantity is a quantity of a product that is unsuccessfully processed and can't be reprocessed.

15. The system according to claim 12, wherein the work-in-process quantity is a quantity of a product that has not yet undergone processing.

16. The system according to claim 12, wherein the work-in-process quantity is at least one of a first quantity of a product that has not yet undergone processing, a second quantity of the product currently undergoing processing, and a third quantity of the product that is unsuccessfully processed but can still be reprocessed.

17. The system according to claim 12, wherein the plurality of reporting points for the first production process is different than the plurality of reporting points for the second production process.

18. The system according to claim 12, wherein the first production process is different than the second production process, the second process structure including a plurality of reporting points that is different than the plurality of reporting points for the first production process.

19. The system according to claim 12, wherein the processor is further adapted to:
transfer, for each unmapped reporting point in the first production process for the order, the scrap quantity and the work-in-process quantity to a reporting point in the second production process for the surviving order as a function of the mapped reporting points using at least one of a first preceding mapped reporting point in first production process and the first reporting point in the second production process.

20. The system according to claim 12, wherein the processor is further adapted to:
transfer, for each unmapped reporting point in the first production process for the order, the scrap quantity and the work-in-process quantity to a reporting point in the second production process for the surviving order as a function of the mapped reporting points using at least one of a first subsequent mapped reporting point in first production process and the last reporting point in the second production process.

21. A system for merging an order with a surviving order in a flexible order transaction system wherein production of the order is currently in progress, comprising:
a program memory;
a storage device, the storage device containing a mapping table; and
a processor, wherein the processor is adapted to:
(i) receive a request to merge the order, the request specifying the surviving order,
(ii) determine at least one of a yield quantity, a scrap quantity, and a work-in-process quantity at each reporting point in a first production process for the order, the first production process including a plurality of reporting points,
(iii) map at least two pairs of reporting points between the first production process for the order and a second production process for the surviving order as a function of the mapping table, the mapping table stored as part of the flexible order transaction system and the second production process including a plurality of reporting points,
(iv) merge, at each mapped pair of reporting points, the yield quantity, the scrap quantity, and the work-in-process quantity from the order to the surviving order, and
(v) transfer, for each unmapped reporting point in the first production process for the order, the scrap quantity and the work-in-process quantity as a function of the mapped reporting points.

22. A computer-readable medium containing a set of instructions adapted to be executed by a processor to implement a method for merging an order with a surviving order in a flexible order transaction system wherein production of the order is currently in progress, the method comprising the steps of:
receiving a request to merge the order, the request specifying the surviving order;
determining at least one of a yield quantity, a scrap quantity, and a work-in-process quantity at each reporting point in a first production process for the order, the first production process including a plurality of reporting points;

mapping at least two pairs of reporting points between the first production process for the order and a second production process for the surviving order, the second production process including a plurality of reporting points;

merging, at each mapped pair of reporting points, the yield quantity, the scrap quantity, and the work-in-process quantity from the order to the surviving order; and transferring, for each unmapped reporting point in the first production process for the order, the scrap quantity and the work-in-process quantity as a function of the mapped reporting points.

\* \* \* \* \*